W. B. WILLIS.
Seed Planter.
No. 7,044. Patented Jan. 22, 1850.
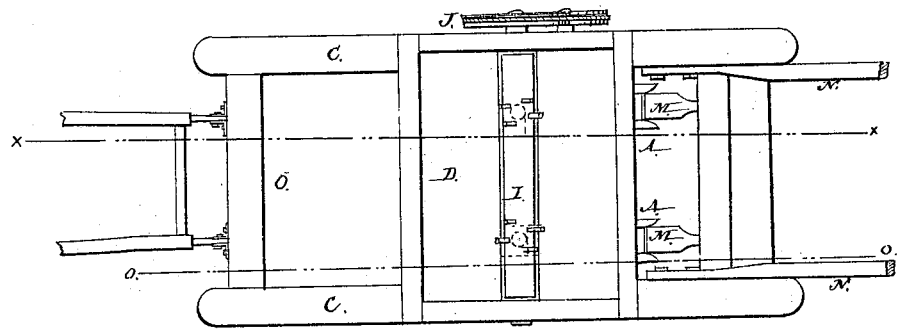
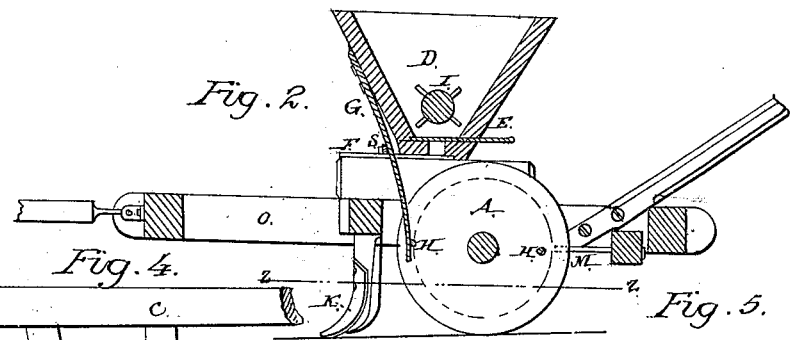
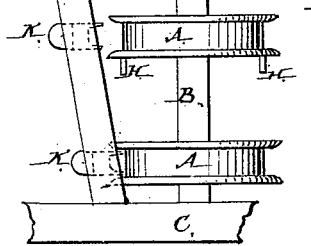
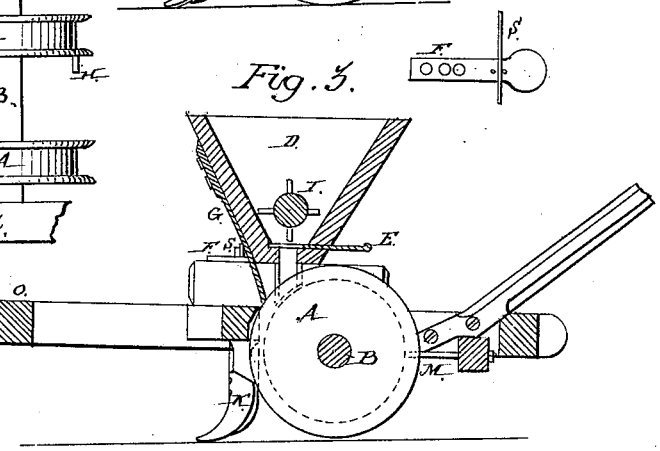

UNITED STATES PATENT OFFICE.

WILLIAM B. WILLIS, OF CHARLESTOWN, VIRGINIA.

IMPROVEMENT IN SEED-PLANTERS.

Specification forming part of Letters Patent No. 7,044, dated January 22, 1850.

*To all whom it may concern:*

Be it known that I, WILLIAM B. WILLIS, of near Charlestown, Jefferson county, Virginia, have invented a new and useful Improvement in Machines for Planting and Drilling Grain and Seed and for other purposes, called "Willis's Improved Seeding Machine," which is described as follows, reference being had to the accompanying drawings of the same, making part of this specification.

Figure 1 is a plan or top view of the machine. Fig. 2 is a vertical longitudinal section on the line $x\ x$ of Fig. 1. Fig. 3 is also a longitudinal section on the line $o\ o$ of Fig. 1. Fig. 4 is a horizontal section on the line $z\ z$ of Fig. 2. Fig. 5 is a plan of the perforated slide.

Similar letters in the several figures refer to corresponding parts.

The main body of this machine is made and operated like other seeding-machines in use, and therefore I shall not give a minute description of the same.

The essential improvement that I have made in the machine, and which I desire to have secured to me by Letters Patent, relates to the construction and arrangement of the supporting and propelling wheels, which have their peripheries made with circular flanges for the purpose of confining the seed to the peripheries of the wheels, and prevent the clods falling into the furrow made by the plow, pulling off any vegetation—such as roots of clover, straw, weeds, and other substances that may collect around the helve at its connection with the shovels—gathering the fine earth to cover the seed, the peripheries of the wheels between the flanges serving as rollers to roll in the seed and as bearings or fulcra while bearing upon the handles at the rear end of the frame to raise the fore end to turn the same to the right or the left, rendering the machine perfectly manageable to the seed-man, and enabling him to pass it over roots and through cloddy land, and having the capacity to cut its own way through the clods and roots.

A are the flanged wheels aforesaid, for performing the several offices just named.

B is the axle on which the wheels A are placed, arranged as far back toward the rear end of the frame as to bring the peripheries of the wheels nearly under the center of the hopper and the flanges near the wings of the cultivator-teeth, for the purpose above stated of receiving the seed as it drops from the hopper and cleaning the teeth of weeds. The wheels are to be made of cast-iron or other suitable material, of any required diameter and depth of flange necessary to accomplish the object intended. The bearings or boxes for the axles are made and arranged in the usual manner.

C is the frame.

D is the hopper into which the seed to be planted is placed.

E is a slide for preventing the descent of the seed through the bottom of the hopper when the planting is required to be stopped. In Fig. 2 this slide is represented as being shoved into its seat to close the apertures in the bottom of the hopper. In Fig. 3 it is represented as drawn out to let the seed descend. These slides are made in the usual manner.

F is an alternating slide for dropping the seed in hills.

G is a spring-lever for moving the slide in and out. This spring-lever is attached to the slide F by a spring, S, and has one of its ends fastened to the hopper, while its opposite end is loose and is moved out from the center of the wheel by a pin or cog, H, projecting from the side of the wheel A, which strikes against it at every revolution of the wheel. In order to make the perforated feeding slide move back and forth several times at each revolution of the wheel to drop the seed at short distances apart, several pins similar to that lettered H must be inserted into the wheel in a circle at equal distances apart. The elasticity of the spring-lever brings back the slide after having been moved outward by the pins H. The construction and operation of this slide, being like others in use, need not be more particularly described.

I is a revolving stirrer or agitator, placed in the hopper for stirring or agitating the seed and preventing its becoming clogged in the bottom of the hopper.

J is a band that connects the pulley on the stirrer with the pulley on the wheel-axle, for causing the stirrer to rotate when the wheels revolve.

K are the drill-teeth, made and secured to the frame in the usual manner.

M are permanent scrapers, attached to the frame for keeping the peripheries of the wheels clean or free from accumulating clay or dirt.

N are the handles by which the machine is managed.

O is the end of the frame to which the horses are attached.

The operation of this machine is similar to that of other planting-machines in use, except so far as relates to the flanged wheel, which receives the seed between its flanges, as described, as it descends from the hopper, and conveys it to the furrow by passing it round through the hollow of the drill-tooth immediately in front of it, prevents the clods from falling into the furrow, allows the fine earth to cover the seeds, cuts the clods and weeds, clears the drill-tooth of obstructions, pulls off weeds and straw that may have accumulated on the helve, propels the frame, hopper, &c., turns the stirrer, and serves as a roller to crush clods and as a fulcrum for the beams of the frame, enabling the farmer to elevate or depress the forward end of the frame, bearing lightly upon the handles, as the frame is nearly balanced on the wheels, and to guide and turn the machine as he may desire with great ease, the smooth portion of the periphery of the wheel serving also to press the fine earth over and upon the seed as the machine moves forward.

It will be understood that the hopper is to be provided with such perforated and imperforated slides and arrangement of springs, levers, and cogs or pins as the nature of the planting or seeding may require. In planting cotton-seed the slide (when one is used) should have a large opening and a quick movement, and be otherwise adapted for the purpose intended. The machine, however, will plant cotton-seed without the use of a perforated alternating slide. The revolving stirrer effectually prevents the cotton-seed becoming matted together and keeps up a regular and constant feed. When small seeds are to be planted thick the slide can be used, or it may be omitted.

I do not claim the frame, hopper, stirrer, slide, drills, nor any of the parts heretofore used in seeding-machines.

I only claim as my invention—

The employment of the flanged supporting, conveying, cleaning, and covering-wheel A, made as described, in combination with the rest of the machine, when made in the manner as above set forth, for planting cotton and other seeds and for other purposes.

In testimony whereof I have hereunto signed my name before two subscribing witnesses.

WM. B. WILLIS.

Witnesses:
T. W. KEYES,
JOS. E. BELL.